United States Patent [19]

Nishi et al.

[11] Patent Number: 5,039,928
[45] Date of Patent: Aug. 13, 1991

[54] ACCUMULATOR FOR PORTABLE COMPUTERS

[75] Inventors: Kazuo Nishi, Sagamihara; Kunio Suzuki, Tokyo; Mikio Kinka, Atsugi; Akemi Satake, Atsugi; Shuichi Kugawa, Atsugi, all of Japan

[73] Assignee: Semiconductor Energy Laboratory Co., Ltd., Kanagawa, Japan

[21] Appl. No.: 448,316

[22] Filed: Dec. 11, 1989

[30] Foreign Application Priority Data

Dec. 9, 1988 [JP] Japan .................... 63-160056

[51] Int. Cl.⁵ .......................... H01M 10/46
[52] U.S. Cl. ........................ 320/2; 136/291; 364/700; 364/705.01; 364/708
[58] Field of Search ............... 429/9; 136/291; 320/2, 320/21; 364/700, 705.01, 708

[56] References Cited

U.S. PATENT DOCUMENTS

| | | | |
|---|---|---|---|
| 4,325,108 | 4/1982 | Spingler | 362/183 |
| 4,563,727 | 1/1986 | Curiel | 362/183 |
| 4,686,441 | 8/1987 | Petterson | 320/2 |

FOREIGN PATENT DOCUMENTS

| | | | |
|---|---|---|---|
| 61-141184 | 6/1986 | Japan | 136/291 |
| 1-64371 | 3/1989 | Japan | 136/291 |

Primary Examiner—Aaron Weisstuch
Attorney, Agent, or Firm—Sixbey, Friedman, Leedom & Ferguson

[57] ABSTRACT

A portable electric appliance is provided with a solar energy accumulator. The accumulator is integrally mounted on the electric appliance when the appliance is desired to operate or be transported. When the portable electric appliance is not used, the accumulator is removed from the appliance and moved to a bright place.

8 Claims, 4 Drawing Sheets

ACCUMULATOR FOR PORTABLE COMPUTERS

BACKGROUND OF THE INVENTION

The present invention relates to accumulators for portable electric appliances.

Along with the demands for portable-type electric appliances such as lap-top computers and compact word-processors, it is desired to decrease the sizes and the weight of the portable appliances. The power sources of such portable appliances are for example dry cells. A dry cell may, however, accidentially cause the user to run out of energy on the way during his business. This may be a serious trouble if his business is very urgent. Moreover, it is an environmental problem where and how to discard exhausted cells.

Alternatively, built-in solar cells have been used in pocket electric calculators for example. However, the energy produced by such a built-in solar cell is not so large and therefore the application thereof is limited only to relatively small and low power consuming devices.

SUMMARY OF THE INVENTION

It is therefore an object of the present invention to provide an accumulator for portable electric appliances which can supply enough energy thereto.

In order to accomplish the above and other objects and advantages, the accumulator can be detachably mounted on a portable electric appliance. When the portable electric appliance is used, the accumulator is mounted in order to power it. When the portable electric appliance is not used, the accumulator is detached and moved to a bright place in order to accumulate sufficient solar energy.

The configuration of the accumulator is designed in accordance with the electric appliance on which the accumulator is mounted. The electric connection between the accumulator and the appliance may be accomplished by a cable. Alternatively, necessary electric contacts may be formed on an appropriate position of the accumulator while counterpart contacts are formed on a corresponding position of the appliance in order that the corresponding contacts are coupled with each other when the accumulator is mounted.

BRIEF DESCRIPTION OF THE DRAWING

This invention can be better understood from the following detailed description when read in conjuction with the drawing in which.

DETAILED DESCRIPTION OF THE PREFERRED EMBODIMENTS

Figure 1:
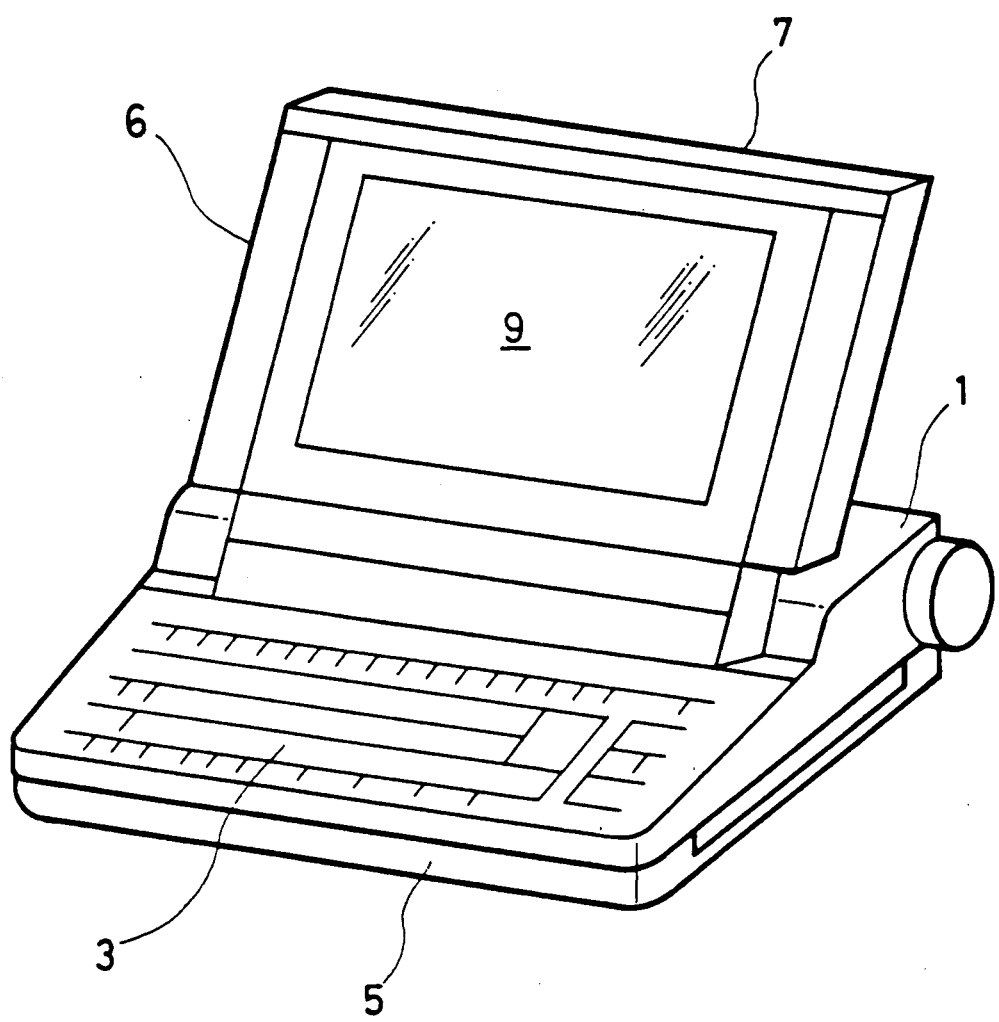
FIG. 1 is a perspective view showing a word-processor provided with an accumulator in accordance with the present invention.

Referring now to FIG. 1, a word processor of laptop type provided with an accumulator in accordance with the present invention is illustrated. The word processor comprises a processor unit housed in a frame 1, a keyboard 3, and a display board 7 hinged on the frame 1 and provided with a non-volatile ferroelectric liquid crystal display 9 on the inside. The display board 7 functions as a lid of the word processor covering the keyboard 3. The bottom of the frame 1 is adapted to be coupled with an accumulator 5 which supplies electric energy to the processor.

Figure 2:
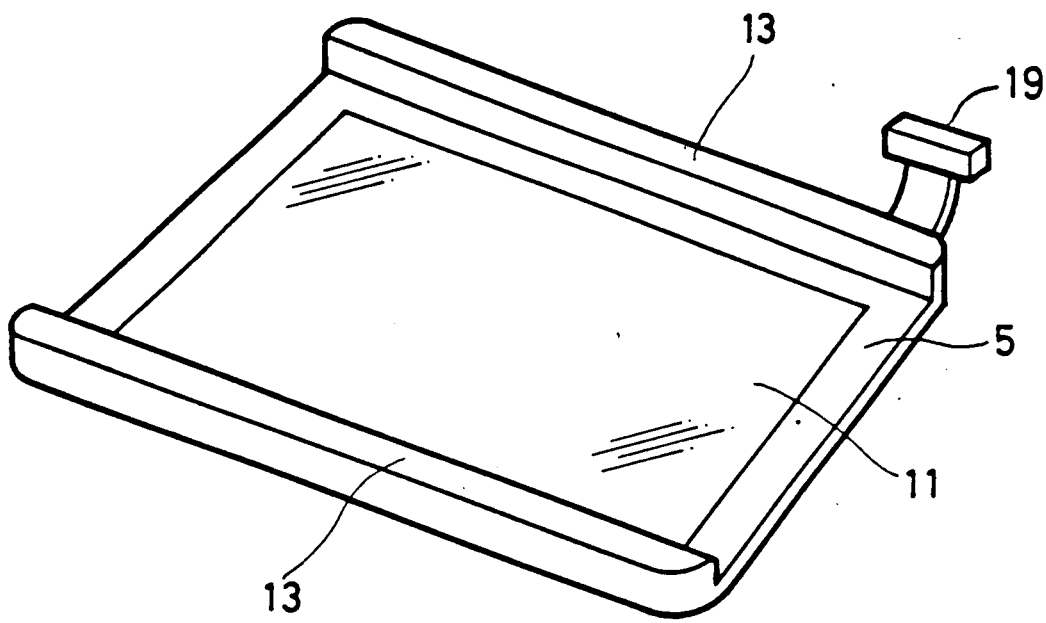
FIGS. 2 and 3 are perspective and cross-sectional views showing an accumulator in accordance with the present invention.
Figure 3:
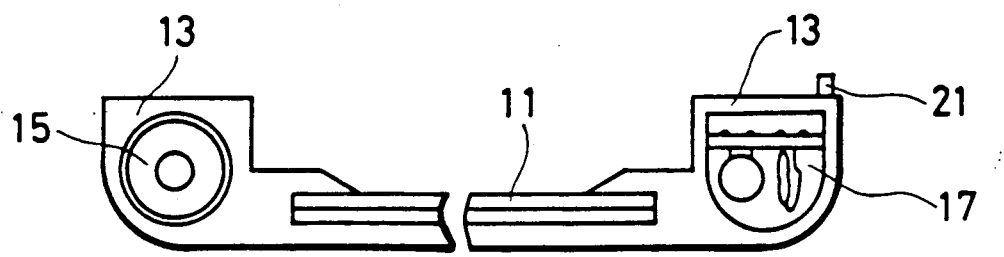
Figure 4:
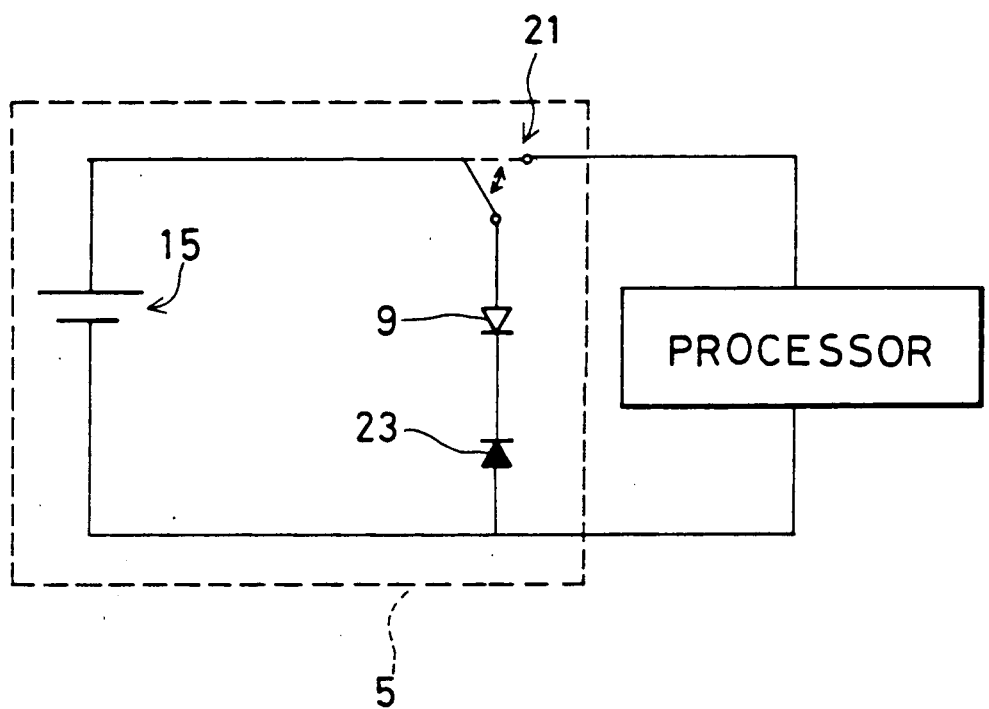
FIG. 4 is a diagram showing the charging circuit of an accumulator in accordance with the present invention.

The accumulator 5 is illustrated in FIGS. 2 and 3. The accumulator 5 comprises a flat board supporting a solar cell 11 and a pair of housings 13 projected upwards from the opposed edges of the flat board. The solar cell 11 consists of a series connection of photoelectric conversion devices which are constructed by coating a lower electrode arrangement on a glass substrate, depositing and patterning an amorphous semiconductor film incorporating a pin junction and coating an upper electrode arrangement. The upper electrode arrangement is made from a transparent conductive material such as ITO in order to introduce light rays therethrough into the semiconductor. A nickel-cadmium cell 15 is placed in one of the housings 13 and a control circuit 17 for charging and discharging in the other housing. A connector 19 is provided for supplying energy to the word processor. The control circuit 17 is designed in order that when the accumulator 5 is mounted on the bottom of the frame 1 the solar cell 11 is connected with the processor in order to discharge electric energy therefrom, and when the accumulator 5 is removed from the frame the solar cell 11 is connected with the nickel-cadmium cell in order to store electric energy in the cell. Actually, the switching operation is done by means of a buttom 21 which is automatically pushed down when the storage device is mounted. FIG. 4 is a schematic circuit diagram for illustrating the solar energy charging and discharging in accordance with the present invention. Numeral 23 designates a diode for blocking reverse current.

Figure 5:
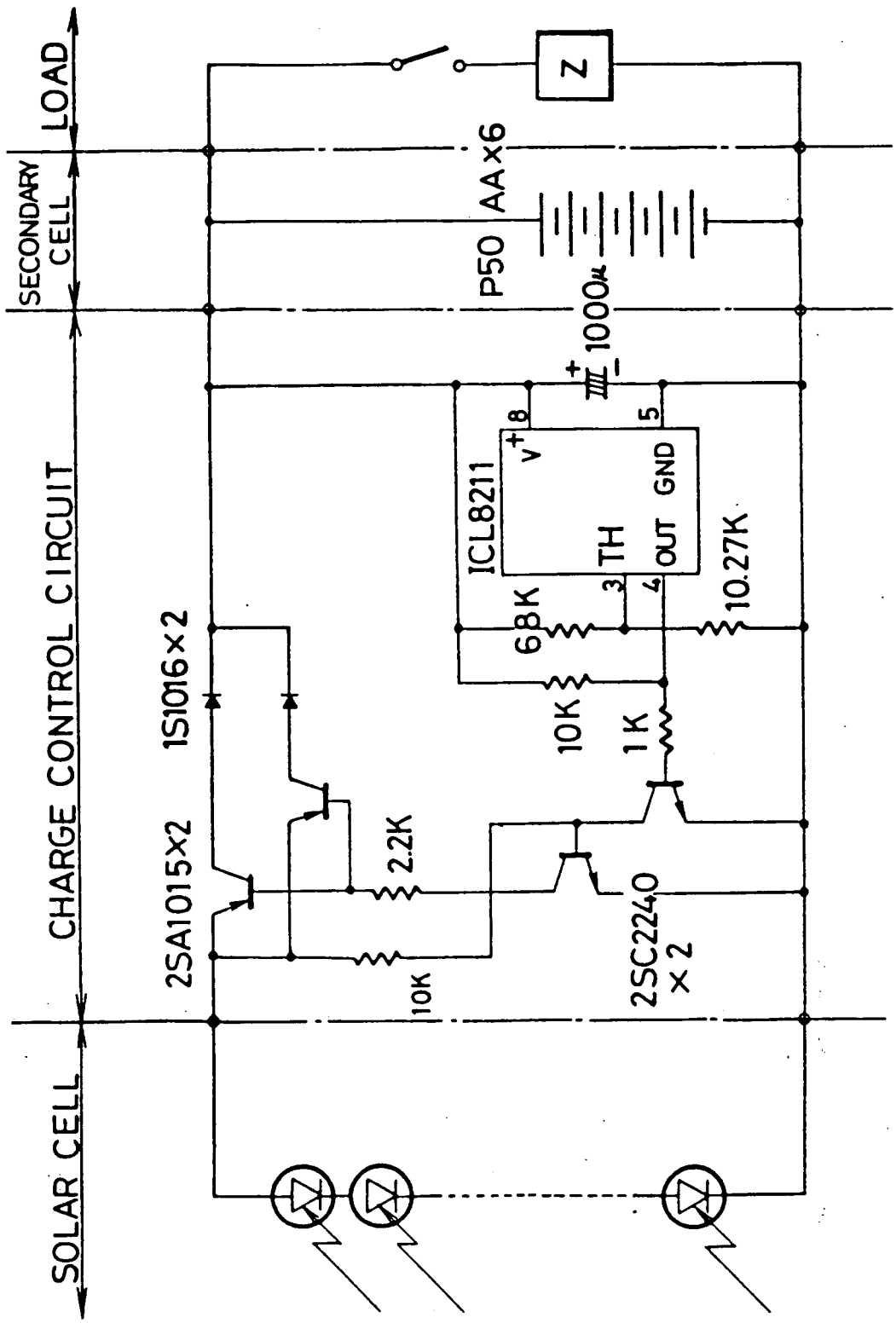
FIG. 5 is a schematic diagram of an illustrative charging circuit.

FIG. 5 is a circuit diagram showing a practical example of the charging circuit. The circuit includes an IC chip which is coupled with the secondary cell in order to detect the voltage level applied to the secondary cell. When the voltage exceeds a threshold level predetermined and set up at an input terminal of the chip, the IC chip produces a signal indicative that the voltage across the secondary cell is too high. The signal is supplied to a transistor circuit which breaks the connection between the secondary cell and the solar cell in order not to apply an overvoltage to the secondary cell.

In operation, when it is desired to use the word processor, the accumulator 5 is mounted on the bottom of the frame 1 to power the processor, and when the word processor is not used the storage solar cell 5 is detached from the frame 1 and exposed to direct illumination of solar rays. Of course, by exposing the solar cell to external light and placing some weight upon the buttom 21 to put the accumulator upon its charging condition, solar energy can be accumulated while the word processor operates.

While several embodiments have been specifically described by way of examples, it is to be appreciated that the present invention is not limited to the particular examples described and that modifications and variations can be made without departing from the scope of the invention as defined by the appended claims. Some examples are as follows. Although the example is prepared for a word processor, the present invention can be applied for forming the power sources for general computer system of portable type, e.g. laptop personal computer systems. In place of the nickel-cadmium cell, any secondary cell can be used, e.g. nickel-zinc cells, alkali-manganese cells and the like. Furthermore, the accumulator can be constructed in accordance with the present invention in order to detachably fixed on the upper surface of electric appliances rather than the bottom.

What is claimed is:

1. A power source for a portable computer system comprising a display means, data inputting means and data processing means, said power source being detachably connectable to said system and comprising a solar cell, a secondary battery for storing electric energy generated by said solar cell and for supplying said system with electric power and a rectifying means located between said solar cell and said secondary battery in order to avoid charges stored in said secondary battery from discharging to said solar cell, wherein said power source can be detached from said system so that said power source is placed under bright light in order to charge said secondary battery with photogenerated charges from said solar cell and further including means for connecting said solar cell to said secondary battery whenever the power source is in its detached stated with respect to the portable computer system.

2. The power source of claim 1 wherein said power source is adapted to be mounted on the bottom of said portable computer system.

3. The power source of claim 1 wherein said power source comprises a flat board supporting said solar cell thereon and a pair of housings raised from opposed edges of said board.

4. A power source as in claim 5 including means for connecting said solar cell to said secondary battery in response to the power source being detached from the portable computer system.

5. In combination, a power source and a portable computer system where said portable computer system includes a display means, data inputting means and data processing means and where said power source is detachably connectable to said system and includes a solar cell, a secondary battery for storing electric energy generated by said solar cell and for supplying said system with electric power and a rectifying means located between said solar cell and said secondary battery in order to avoid charges stored in said secondary battery from discharging to said solar cell, wherein said power source can be detached from said system so that said power source is placed under bright light in order to charge said secondary battery with photogenerated charges from said solar cell wherein said power source includes means for connecting said solar cell to said secondary battery whenever the power source is in its detached state with respect to the portable computer system.

6. The combination as in claim 5 where said power source includes means for connecting said solar cell to said secondary battery in response to the power source being detached from the portable computer system.

7. A method of charging a power source for a portable computer system including a display means, data inputting means and data processing means, said power source being detachably connectable to said system and including a solar cell, a secondary battery for storing electric energy generated by said solar cell and for supplying said system with electric power and a rectifying means located between said solar cell and said secondary battery in order to avoid charges stored in said secondary battery from discharging to said solar cell, said method comprising the steps of detaching said power source from said system and placing said power source under bright light in order to charge said secondary battery with photogenerated charges from said solar cell said method further including connecting said cell to said secondary battery whenever the power source is in its detached state with respect to the portable computer system.

8. The method as in claim 7 including connecting said solar cell to said secondary battery in response to the power source being detached from the portable computer system.

* * * * *